United States Patent
Kim et al.

(10) Patent No.: US 11,582,652 B2
(45) Date of Patent: Feb. 14, 2023

(54) SMART VEHICLE HANDOVER METHOD IN OVERLAPPED NETWORK ENVIRONMENT

(71) Applicant: INDUSTRY ACADEMIC COOPERATION FOUNDATION OF YEUNGNAM UNIVERSITY, Gyeongsan-si (KR)

(72) Inventors: Young Tak Kim, Gyeongsan-si (KR); Hyun Dong Hwang, Gyeongsan-si (KR)

(73) Assignee: Industry Academic Cooperation Foundation Of Yeungnam University, Gyeonsan-Si (KR)

(*) Notice: Subject to any disclaimer, the term of this patent is extended or adjusted under 35 U.S.C. 154(b) by 26 days.

(21) Appl. No.: 17/136,545

(22) Filed: Dec. 29, 2020

(65) Prior Publication Data

US 2022/0150775 A1 May 12, 2022

(30) Foreign Application Priority Data

Nov. 10, 2020 (KR) .................. 10-2019-0149149

(51) Int. Cl.
*H04W 4/44* (2018.01)
*H04W 36/00* (2009.01)
(Continued)

(52) U.S. Cl.
CPC ...... *H04W 36/0072* (2013.01); *H04B 7/2656* (2013.01); *H04W 4/44* (2018.02);
(Continued)

(58) Field of Classification Search
CPC ..... H04W 4/44; H04W 4/46; H04W 36/0055; H04W 36/0072; H04W 36/00835; H04W 36/32; H04W 48/20
(Continued)

(56) References Cited

U.S. PATENT DOCUMENTS

| 2012/0127874 A1* | 5/2012 | Oh ................... H04W 4/46 370/252 |
| 2012/0163275 A1* | 6/2012 | Kim ................. H04W 36/32 370/312 |
| 2014/0328254 A1* | 11/2014 | Lim ............... H04W 36/0055 370/328 |

FOREIGN PATENT DOCUMENTS

| KR | 20060034067 A | 4/2006 |
| KR | 20110065262 A * | 6/2011 |

(Continued)

OTHER PUBLICATIONS

English translation of KR 20130015629 (Year: 2013).*
(Continued)

*Primary Examiner* — Harun Chowdhury
(74) *Attorney, Agent, or Firm* — Osha Bergman Watanabe & Burton LLP

(57) ABSTRACT

A handover method for managing WBSS vehicle network managed by a WESS-CM includes: recognizing that a vehicle enters an overlapped area between first and second WBSSs; sending, by the first WBSS, a handover recommend request to the WESS-CM; confirming with the second WBSS, by the WESS-CM, whether handover is possible; responding to the WESS-CM, by the second WBSS, the availability of the handover after allocating communication resources; sending, by the WESS-CM, a handover recommend response to the first WBSS; transmitting, by the first WBSS, a handover request message to the vehicle; performing the handover, by the vehicle, by performing reassociation with the second WBSS; and periodically broadcasting, by the vehicle, basic safety message using a T-slot in shared control channel and a T-slot in BSM channel for the second WBSS, while the vehicle is located in the overlapped area.

9 Claims, 7 Drawing Sheets

(51) Int. Cl.
  *H04W 56/00* (2009.01)
  *H04B 7/26* (2006.01)
  *H04W 60/04* (2009.01)

(52) U.S. Cl.
  CPC ... *H04W 36/00835* (2018.08); *H04W 56/001* (2013.01); *H04W 60/04* (2013.01)

(58) Field of Classification Search
  USPC ............................... 370/252, 328, 329, 331
  See application file for complete search history.

(56) References Cited

FOREIGN PATENT DOCUMENTS

| KR | 20120071289 A | | 7/2012 |
|----|---------------|---|--------|
| KR | 20130015629 A | * | 2/2013 |

OTHER PUBLICATIONS

English translation of KR 20110065262 (Year: 2011).*
Office Action issued in corresponding Korean Patent Application No. 10-2020-0149149, dated Aug. 11, 2021 (9 pages).

\* cited by examiner

SMART VEHICLE HANDOVER METHOD IN OVERLAPPED NETWORK ENVIRONMENT

CROSS-REFERENCE TO RELATED APPLICATIONS

This application claims the benefit under 35 U.S.C. 119(a) of Korean Patent Application No. 10-2020-0149149 filed on Nov. 10, 2020 with the Korean Intellectual Property Office, the entire disclosure of which is incorporated herein by reference for all purposes.

BACKGROUND

1. Field

This application relates to a vehicle handover method, and more specifically, to a smart handover management method using time division multiple access slots in an overlapped vehicle network environment.

2. Description of Related Art

In order to implement an intelligent transportation system (ITS) that mainly targets to improve safety on roads by broadcasting time-critical safety messages of the information of vehicles (i.e., position, moving direction, velocity), abnormal traffic and road conditions, expected danger of collision, and imminent crash, an efficient communication between vehicle-to-infrastructure (V2I) and vehicle-to-vehicle (V2V) are essential.

Currently available standards of vehicular networking are IEEE 802.11p, IEEE 1609, and wireless access in vehicular environment (WAVE). The WAVE allows mobile wireless communication at high driving speed (up to 200 Km/h) among vehicles with onboard unit (OBU) or among vehicles and infrastructure with roadside unit (RSU) within a range of up to 1 km.

IEEE 802.11p standard defines amendments to the IEEE 802.11 medium access control (MAC) and physical layer (PHY) to support data exchange in high-speed mobile vehicular environment. The IEEE 1609 standard defines the operations of WAVE in higher communication layers.

Channel access in IEEE 802.11p is controlled by the CSMA/CA (Carrier Sense Multiple Access with Collision Avoidance) mechanism and the Enhanced Distributed Channel Access (EDCA) scheme for high priority safety messages using high priority access categories (AC). BSM (Basic Safety Message) transmission using high-priority AC competes for a channel that uses a small contention window size, so there is a problem that when multiple OBUs try to broadcast BSMs at the same time, the possibility of transmission collision increases. The probability of collision for BSM message transmission is especially high in overlapped vehicle network.

The IEEE 1609.4 specifies the multi-channel coordination for the devices based on carrier sense multiple access with collision avoidance (CSMA/CA). Many research works have reported that the multi-channel access scheme with CSMA/CA provides poor performances in reliable delivery of time-critical basic safety message (BSM) in dense vehicular ad-hoc network (VANET) environments, and several MAC protocols based on time division multiple access (TDMA) have been proposed.

In the TDMA-based MAC protocol, TDMA slots (T-slots) are reserved for BSM broadcasting by specific OBUs based on pre-processed scheduling by a centralized cluster header, and this may avoid channel contentions for BSM exchanges, thereby enhancing the performance of BSM deliveries.

SUMMARY

In order to solve the above technical problem, the present application provides a smart vehicle handover method for managing Wireless Access in Vehicle Environments (WAVE) Basic Service Set (WBSS) vehicle network which is managed by a Wireless Access in Vehicle Environments (WAVE) Extended Service Set (WESS) Control and Management System (WESS-CM) and provided by using Road Side Unit (RSU) in multiple vehicle environments having overlapped areas. The smart vehicle handover, proposed in this application, is started when a vehicle enters an overlapped area between a first WBSS and a second WBSS, and it is comprised of requesting, by the first WBSS, a handover recommend to the WESS-CM, confirming with the second WBSS, by the WESS-CM, whether handover is possible, responding to the WESS-CM, by the second WBSS, the availability of the handover after allocating communication resources available for the vehicle, responding, by the WESS-CM, to the handover recommend to the first WBSS, transmitting, by the first WBSS, a handover request message to the vehicle, and performing the handover, by the vehicle receiving the handover request message, by performing reassociation with the second WBSS, wherein the handover request message is transmitted by using a T-slot (TDMA slot) which is one of a plurality of T-slots divided from one synchronization interval in a vehicle network system configured with a TDMA-based MAC protocol.

Further, the WBSS operates a control channel (CCH) and a basic safety message channel (BSMCH) together by using a dual radio interface.

Further, the T-slots within the one synchronization interval of the control channel are divided into groups of the same number as the number of the WBSS and allocated to the WBSS, respectively, and wherein the synchronization interval of the BSMCH are divided into a plurality of T-slots, and the number of T-slots is the maximum number of vehicles that can be accommodated in the WBSS within the synchronization interval.

Further, the first T-slot of the group is used for broadcasting a beacon frame wherein the beacon frame includes any one or more of time division multiple access information of the WBSS required when a registration is requested by a vehicle that enters the WBSS, allocation information of the BSMCH, the road side unit position information and WBSS cell radius information of the road side unit (RSU).

Further, the remaining T-slots of the group excluding the beacon frame are used by dividing into a Carrier Sense Multiple Access with Collision Avoidance (CSMA/CA) mode slot section and a Time Division Multiple Access (TDMA) mode slot section.

Further, the T-slots in the CSMA/CA mode section are used for registration request, when the vehicle enters the WBSS, and data transmission requests from registered vehicles.

Further, the requesting the handover recommend transmits handover recommend request message including association identifier, vehicle driving information, and WBSS identifier (WBSSID) to the WESS-CM.

Further, the confirming whether handover is possible, comprises determining, by the WESS-CM, the second WBSS for performing handover based on driving information of the vehicle, requesting a handover accept, by the WESS-CM, to the second WBSS, and responding to the WESS-CM, by the second WBSS, after checking and allocating resources available for the vehicle.

Further, the handover request message include WBSS identifier (WBSSID), basic safety message channel (BSMCH), and association identifier (AID) information and wherein the vehicle changes a vehicle settings based on WBSS identifier (WBSSID), basic safety message channel (BSMCH), and association identifier (AID) information.

Further, the performing of the handover comprises transmitting, by the first RSU/WBSS, a handover confirm message to the WESS-CM, transmitting, by the WESS-CM, a handover confirm message to the second RSU/WBSS, updating, by the second RSU/WBSS, a handover list, receiving, by the vehicle, a beacon frame transmitted from the second RSU/WBSS, confirming, by the vehicle, T-slot information included in the beacon frame, transmitting, by the vehicle, a Re-Association request message to the second RSU/WBSS by using the T-slot of the second RSU/WBSS based on the T-slot information, allocating a T-slot available for the vehicle in the second RSU/WBSS, transmitting, by the second RSU/WBSS, the Re-Association request confirm message including the allocated T-slot information to the vehicle, and transmitting the complete of the handover procedure of the vehicle from the second RSU/WBSS to the WESS-CM.

DETAILED DESCRIPTION

Figure 1:
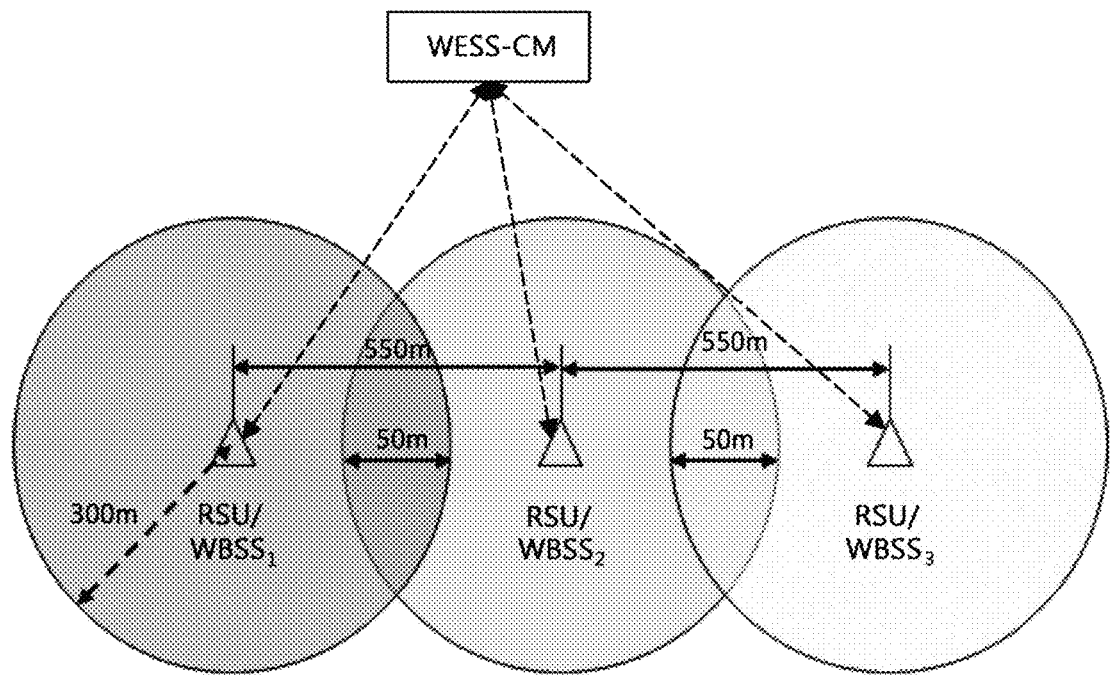
FIG. 1 is a basic structural diagram of a WAVE extended service set (WESS) for explaining the present application.

In the present application, various changes may be made and various examples may be provided, and specific examples are illustrated in the drawings and described in detail.

However, this is not intended to limit the present application to a specific example, it is to be understood to include all changes, equivalents, and substitutes included in the spirit and scope of the present application.

It is to be understood that the terms used in the present application are used only to describe specific examples, and are not intended to limit the present application. Singular expressions include plural expressions unless the context clearly indicates otherwise. In the present application, terms such as "comprise" or "have" are intended to designate the presence of features, numbers, steps, actions, components, parts, or combinations thereof described in the specification, and do not preclude in advance the possibility of the presence or addition of one or more other features, numbers, steps, actions, components, parts, or combinations thereof.

Unless otherwise defined, all terms, including technical or scientific terms, used herein have the same meaning as commonly understood by one of ordinary skill in the art to which the present application belongs. Terms such as those defined in a commonly used dictionary should be interpreted as having a meaning consistent with the meaning in the context of the related technology, and should not be interpreted as an ideal or excessively formal meaning unless explicitly defined in the present application.

Hereinafter, examples of the present application are described in more detail with reference to the accompanying drawings. In describing the present application, in order to facilitate an overall understanding, the same reference numerals are used for the same elements in the drawings, and duplicate descriptions for the same elements are omitted.

The roads on which vehicles drive configure a road network of tens to hundreds of kilometers. Vehicles moving on such roads may perform wireless communication through various connections between vehicles or between vehicles and road side units (RSUs) through WAVE (Wireless Access in Vehicle Environments).

Stable delivery of basic safety messages (BSMs) to vehicles through such WAVE is essential in Intelligent Transportation Systems (ITS) which aims to improve road safety.

However, in the construction of such an ITS, for example, in an area where vehicles are concentrated, such as an intersection in the metropolitan city center or a road with severe congestion, the vehicle network are to be formed closely, and accordingly, an overlapped section inevitably exists, and channel interference and contention generated where the vehicle network overlaps.

The present application is to solve the above technical problem, and provides an efficient management method with smart handover of a vehicle by minimizing the overhead of repeated exchange of registration messages in each WBSS in an overlapped V2X network environment.

In addition, an objective of the present application is to provide a method of allocating control channels per WBSS (WAVE Basic Service Set) in order to avoid unnecessary channel interference between WBSS (WAVE Basic Service Set) in an overlapped V2X network environment.

FIG. 1 illustrates a WESS (WAVE Extended Service Set) for communication with a vehicle of the present application.

WESS may be controlled by a centralized WESS-CM (WESS-Control Manager) and may include one or more WBSS.

FIG. 1 illustrates three WBSSs, that are WBSS1, WBSS2, and WBSS3 being included in the WESS, as an example.

In an example of the present application, the WBSS may cover a cell area with radius (RF transmission range) of 300 m, and it is exemplified that the WBSS may perform communication with a vehicle based on STMC-MAC (Slotted TDMA Multichannel MAC), but is not limited thereto, and the cell radius may be adjusted as needed.

In addition, the WBSS may be configured to include one or more RSU (Road Side Unit), and an example of the present application describes that each WBSS is configured with one RSU and operates, but is not limited thereto, and the number of RSU may be increased as needed.

The wireless communication is performed through radio frequency signal transmissions, and accordingly, the wireless communication network coverage is configured in a cellular form of RF signal radiations with respect to an RSU serving as the central base station.

Therefore, in order to establish a communication network for all areas of the metropolitan city center, there exists inevitably overlapped areas. In order to prevent any discontinuity of vehicular networking, and provide continuous V2X communications, the WBSS must be configured with overlapped area, as shown in FIG. 1.

Referring to FIG. 1, WBSS1 has an area that overlaps with the coverage of WBSS2, and WBSS2 has areas that overlap with the coverages of WBSS1 and WBSS3. To describe by exemplifying WBSS2, the RF channels used in WBSS2 may get interferences from the channels used in WBSS1 and WBSS3.

In order to avoid such interference, this application provides a vehicle network environment through broadcasting with a vehicle by using a TDMA slot (T-slot), thereby providing a stable communication environment in a WESS in which overlapped WBSS areas exist.

Figure 2:
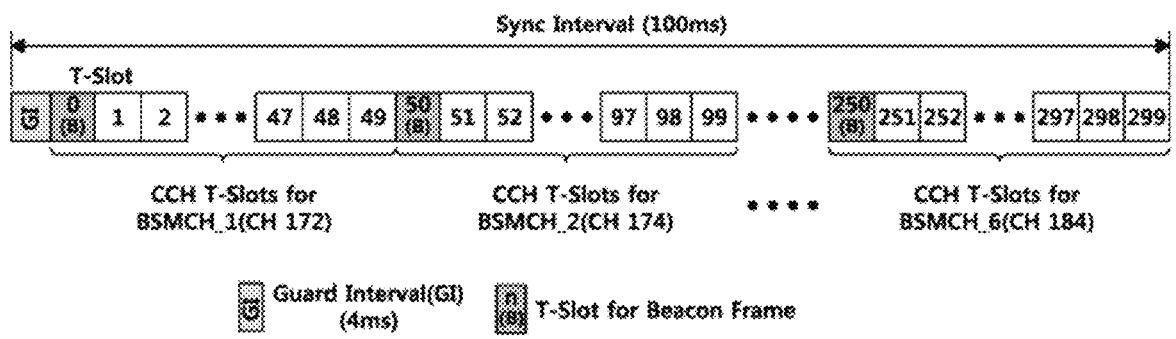
FIG. 2 illustrates a T-slot distribution method of a control channel according to an example of the present application.

FIG. 2 illustrates a T-slot distribution method of a control channel according to an example of the present application.

In order to broadcast Basic Safety Messages (BSMs), a Slotted TDMA Multichannel MAC (STMC-MAC) using a T-slot in a Time Division Multiple Access (TDMA)-based MAC protocol may be used.

The backbone network of WESS may be implemented as Software Defined Networks (SDN)-based distribution system, and non-overlapped BSM channel (BSMCH) is allocated to each WBSS, and the CCH is shared by multiple WBSSs.

More specifically, each WBSS may use a dual radio interface, and the dual radio may use a control channel (CCH) shared by a plurality of WBSS and one dedicated BSMCH. In addition, the On Board Unit (OBU) of a vehicle that communicates with the RSU of WBSS may also operate by using a dual radio scheme of BSMCH and CCH.

Here, the BSMCH may be used for the operation of a service channel (SCH), if there are some T-slots which are not allocated to BSM broadcasting.

Through this method, channel interference by neighboring WBSS can be prevented by allocating non-overlapping BSMCHs to each WBSS, and the T-slots for WBSS are allocated, managed, and controlled by the WESS control and management system (WESS-CM).

The number of T-slots within one synchronization interval is 300, and if one T-slot is allocated to one vehicle, up to 300 vehicles may be managed in one WBSS.

The duration of T-slot is configured with consideration of transmission times for beacon message and BSMs.

For example, when the RF channel frequency of 5.855-5.925 GHz range of IEEE 802.11p, and the message length of beacon and BSM is within 100 bytes, the duration of T-slot is set as 320 micro-seconds that allows up to 300 T-slots in one synchronization interval. The duration of the T-slot can be reduced when a higher RF channel frequency is used or when the size of beacon and BSM size is reduced; and the number of T-slots in one synchronization interval can be increased.

In addition, if only a small number of vehicles in the vehicle network is used and there is a surplus of T-slots in the BSMCH, some of the T-slots corresponding to the surplus may be used for service traffic, and the T-slots used for service traffic may be allocated and managed by the WBSS.

In an example of the present application, the synchronization interval is 100 ms, the number of T-slots is 300, and a total of 300 vehicles broadcast BSMs without collisions using the 300 T-slots at each WBSS cell area.

In an example of the present application, the synchronization interval is 100 ms, the number of T-slots is 300, but it is not limited thereto, and the synchronization interval, the number of T-slots may be adjusted as needed.

In addition, a GI (Guard Interval) is provided at the head of each synchronization interval to prevent collisions that may occur between synchronization intervals.

One synchronization interval in the CCH and BSMCH is divided into a plurality of T-slots according to a preset criterion. In the synchronization interval, 300 T-slots may be divided into 6 groups according to the number of Service Channels (SCHs) that may be used as BSM channel (BSMCH), and each group may be distributed to WBSS and be used as a BSMCH of the WBSS.

Therefore, each WBSS may use 50 T-slots in CCH without collision with neighboring WBSS, and the first T-slot of the 50 T-slots in CCH for each WBSS is used to broadcast beacon frames.

The beacon frame may include: time division multiple access information of the WBSS T-slot allocation information for a service channel (SCH) interval, position information of the road side unit and WBSS cell radius information, which are required for registration request of the vehicle requiring vehicle registration by entering the WBSS.

Some of the T-slots excluding the beacon frames in one group may be used in a carrier sense multiple access with collision avoidance (CSMA/CA) method, and T-slots not used in the CSMA/CA method may be used in the TDMA method.

The CSMA/CA method may be used for access request of a new vehicle entering the WBSS area, and a TDMA section may be used for registration of the new access vehicles.

WESS configured as described above may be managed by a WESS-CM.

WESS-CM maintains a connection status with the RSU in the WBSS through the backbone network, while managing the connection status of RSU by transmitting and receiving information such as the position of the RSU, the usage status of the T-slot, the number of vehicles managed by the WBSS, and the position of the vehicle.

The backbone network interconnects multiple WBSS configuring a large-scale WESS, and it may be implemented by Gigabit Ethernet switches and software-defined networking (SDN) technology with some hierarchy where the SDN controller can provide optimized resource utilization and centralized control. The example of the present application describes a configuration of operating by using internet, however, it is not limited thereto, and any wide-area transport networking technology capable of performing broadband communication between the RSU and the WESS-CM may be used.

Figure 3:
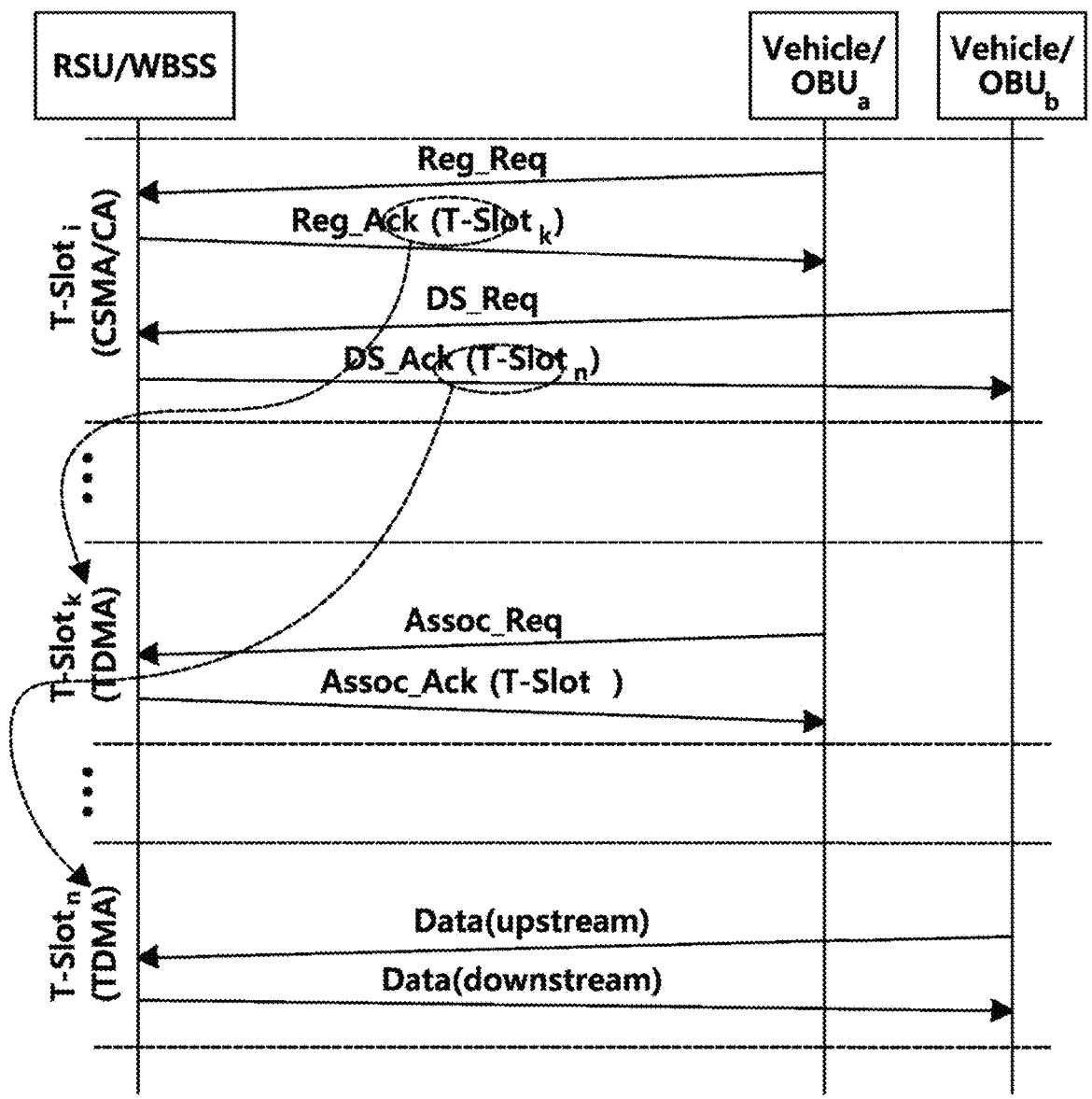
FIG. 3 illustrates a procedure of registration of a vehicle entering a WESS according to an example of the present application.

In the present application, in order to solve the above problem, when a collision occurs while using the BSMCH or procedure of a handover, the T-slot may be set to perform only simple message exchange as the $OBU_b$ illustrated in FIG. 3.

For example, when the $OBU_b$ delivers a data slot request message (DS_Req) through a T-slot processed in CSMA/CA mode, and DS_Req is successfully delivered, the RSU in WBSS may deliver a data slot acknowledgment message (DS_Ack) with a new T-slot information which is located in the cell area without collision or contention, or which includes handover information.

Upon receiving the DS_Ack, the $OBU_b$ may resume transmission/receiving of the BSM between the RSU by changing the configuration of the T-slot according to the allocated T-slot information. In this case, since the identifier is assigned at the time of entry, communication may be resumed immediately without assigning an additional identifier.

Through the above-described method, when a vehicle registered in WESS conducts registration of newly entering vehicles in each WBSS in an overlapped V2X network environment, it is possible to be stable and to minimize BSM packet loss, by minimizing message exchanges with neighboring WBSS.

Figure 4:
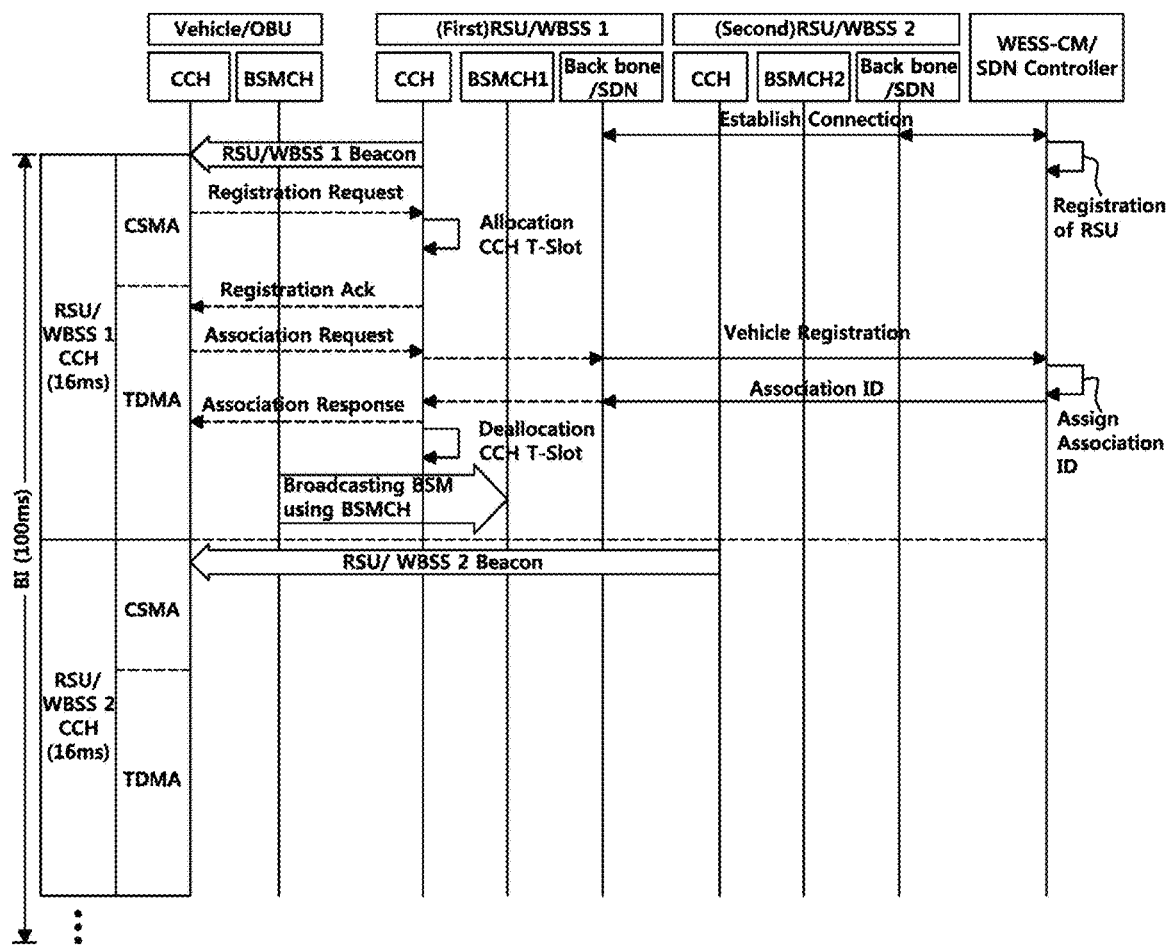
FIG. 4 illustrates a procedure for conducting registration of a new vehicle according to the example of the present application.

FIG. 4 illustrates a method of registration of a vehicle entering a WESS according to an example of the present application.

When a vehicle in which OBU is installed enters a WBSS cell area managed by WESS-CM, it may receive a beacon frame information of CCH periodically transmitted by the RSU in the WBSS.

The vehicle receiving the beacon frame information may transmit a registration request message by using an arbitrary T-slot included in the CSMA/CA section among the T-slots of the CCH.

The RSU may transmit a registration acknowledgement (Reg_Ack) message the a registration request message to the vehicle by using the T-slot of CSMA/CA section of CCH.

Such registration request message and acknowledge message may be registered, acknowledged, and associated in a separate T-slot without contention in order to maximize channel utilization.

The RSU may deliver the vehicle information related to the vehicle registration to WESS-CM.

When the WESS-CM confirms the vehicle registration from the RSU, an Association Identifier (AID) targeting the registered new vehicle is issued and transmitted to the RSU.

Upon receiving the registration acknowledge message, the vehicle may transmit an association request (Assoc_Req) message to the RSU by using the T-slot of TDMA section of CCH.

The association request message may be delivered by using a unicast method which is a method of transmitting data packets only to one specific recipient.

Upon receiving the association request message, the RSU may allocate a T-slot of the BSMCH, and transmit to the vehicle an association response message including the information of the allocated T-slot in BSMCH and the association identifier (AID).

Upon receiving the association acknowledge message, the vehicle may transmit a basic safety message (BSM) at an interval of 100 m using a T-slot in the BSMCH/SCH designated in the received association acknowledge message.

In an example of the present application, it is configured that the BSM message is transmitted at an interval of 100 ms, but the transmission interval of the BSM message may be changed in consideration of various situations such as vehicle traffic, communication conditions, and weather conditions.

By using T-slots in the CSMA/CA section and the TDMA section in CCH for new registration as described above, even if a plurality of vehicles simultaneously enter the WBSS, collision between registration request messages may be minimized.

In addition, through the vehicle registration method, by performing the operation by dividing the vehicle registration request message and the registration acknowledge message into the CSMA/CA method and the TDMA method, the collisions of association request and response messages related to vehicle registration may be prevented in advance.

Such a registration procedure requires several short control message exchanges including registration request (Reg_Req)/registration acknowledgment (Reg_Ack) and association request (Assoc_Req)/association acknowledgment (Assoc_Ack).

If the short control message exchanges for registrations of the vehicle at each handover are processed by CSMA/CA mechanism as in current WAVE/IEEE802.11p standard, CCH contention is severely increased, and accordingly, it is difficult to stably transmit the BSM, thereby resulting in a problem of deteriorating the overall performance.

Figure 5A:
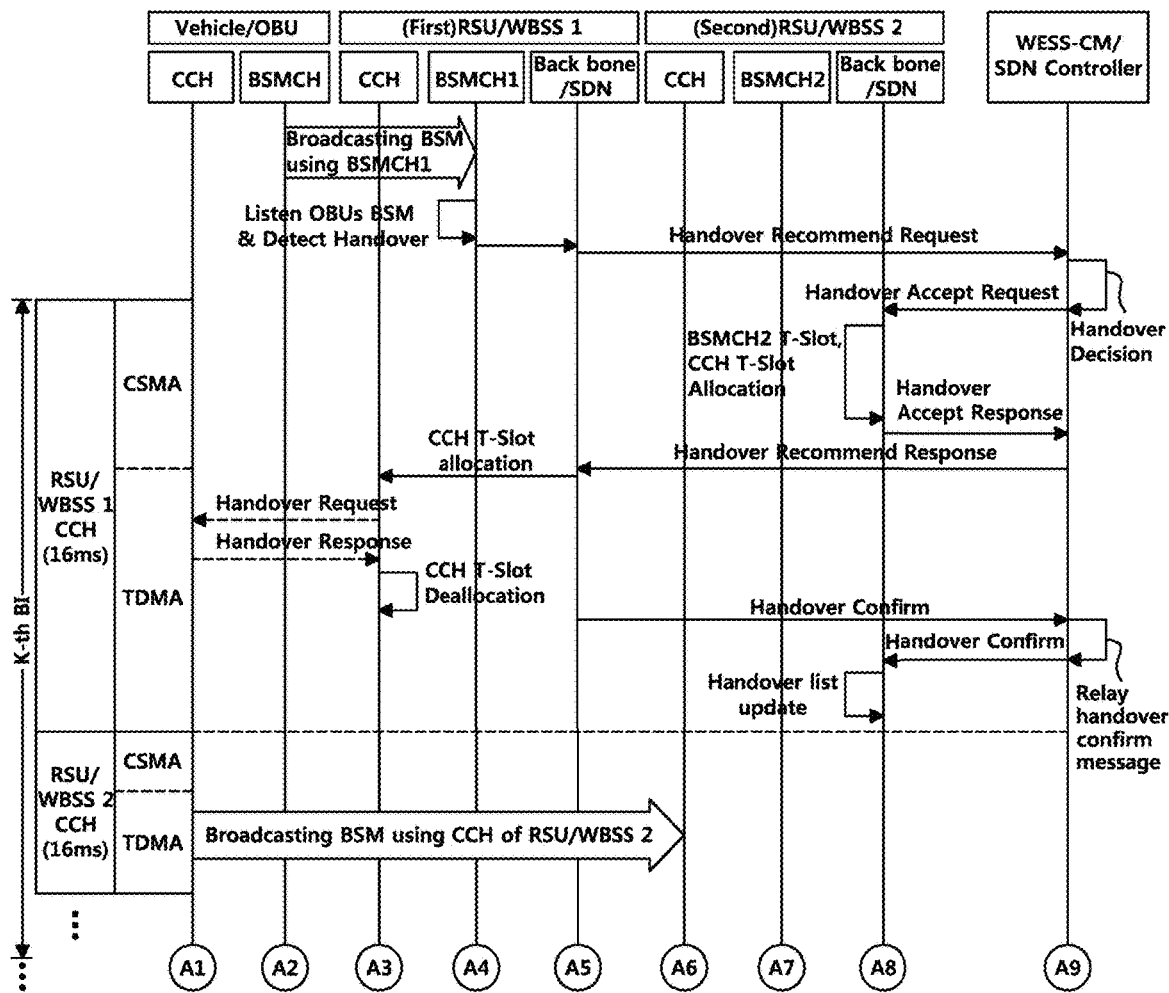
FIGS. 5A and 5B illustrate a vehicle handover procedure according to the example of the present application.
Figure 5B:
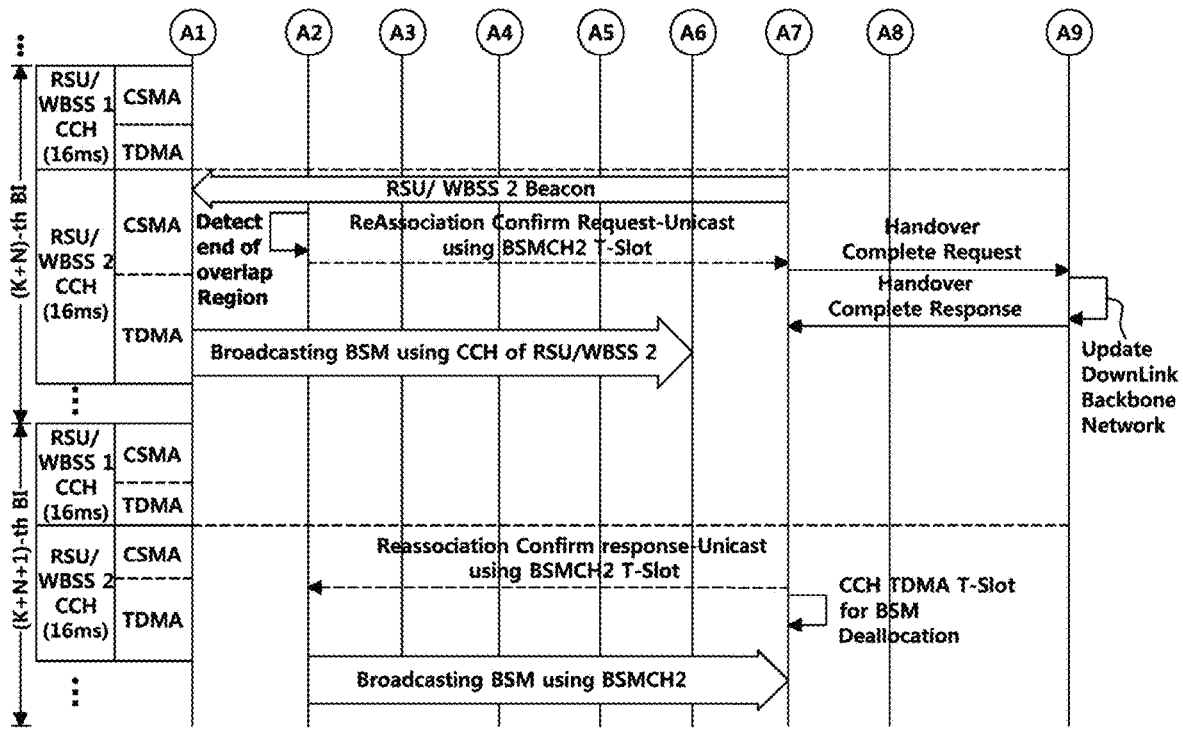

FIGS. 5A and 5B illustrates the handover procedure according to an example of the present application.

If the vehicle reaches the boundary area where the WBSS overlaps while performing periodic BSM broadcasting, the RSU (Hereinafter referred to as first RSU), that is currently controlling the first WBSS where the vehicle is associated, may send a Smart Handover Recommend Request message to the WESS-CM on behalf of the vehicle.

The handover recommend request message may include a vehicle association identifier (AID), WAVE basic service set identifier (WBSSID) of the first RSU, vehicle information (vehicle velocity, current position, driving direction, etc.).

The WESS-CM may search the most suitable RSU (Hereinafter referred to as the second RSU) among neighboring RSUs by checking the availability of smart handover in consideration of the current position, direction of movement, and velocity of the vehicle, and the WESS-CM may transmit a Smart Handover Accept Request message to the second RSU.

The smart handover accept request message may include information such as WBSSID and vehicle information.

When the smart handover accept request message is received from the WESS-CM, the second RSU allocates the T-slot of the BSMCH and the T-slot of the CCH currently available, and transmit Smart Handover Accept Response message including the allocated T-slot of the BSMCH and the T-slot of the CCH to the WESS-CM through the backbone network.

The WESS-CM creates a Smart Handover Recommend Response message that contains the information included in the smart handover accept response message received from the second RSU, and sends it to the first RSU through the backbone network.

The smart handover accept response message may include vehicle association identifier (AID) information, and WBSSID of the second RSU/WBSS.

When the smart handover recommend response message is received, the first RSU may put the T-slot information of the BSMCH and the T-slot information of the CCH included in the smart handover recommend response message into a smart handover request message and send it to the vehicle.

When the OBU/vehicle receives the smart handover request message, the vehicle transmits a Smart Handover Response message to the first RSU in a unicast manner, while changing the T-slot usage setting for using the WAVE basic service set (WBSS) based on the WBSSID, the T-slot information of the BSMCH allocated to the second WBSS, the T-slot information of the CCH which are included in the smart handover request message.

In addition, upon receiving the smart handover response message, the first RSU deallocates the T-slot of the CCH used by the vehicle, terminates communication with the vehicle, and send the smart handover confirm message including the vehicle information to the WESS-CM.

When the smart handover confirm message from the first RSU is received, the WESS-CM may send the handover confirm message to the second RSU.

Upon receiving the smart handover confirm message, the second RSU may update the handover list to include the vehicle information.

Upon receiving the ReAssociation Confirm request message, the second RSU may allocate a T-slot of the BMSCH and transmit a ReAssociation Confirm message including the allocated T-slot information to the vehicle.

When the vehicle receives the ReAssociation Confirm response message from the second RSU, the vehicle may set a transmission/reception channel based on the T-slot information in the ReAssociation Confirm message, and periodically broadcasts its BSM.

When the ReAssociation with the vehicle is completed, the second RSU may transmit a smart handover complete message to the WESS-CM and terminate the smart handover procedure.

In the smart handover between neighboring WBSS presented in the present application, there is no need to exchange registration control messages for the neighbor WBSS at each handover, and only the communication between WESS-CM and RSU is mainly used, and only ReAssociation confirm is performed between the vehicle and the RSU using the CCH T-slot together with BSMCH T-slot information for RSU so that the handover may be performed with minimal message transmitting and receiving through wireless communication, so that BSM loss may be minimized without burdening the wireless network, thereby enabling stable operation and increased performance.

In addition, in the overlapped WBSS environment, vehicles moving to another WBSS through a boundary section use BSMCH and CCH together to broadcast BSM, so that there is no loss of BSM transmission to both vehicles belonging to the outgoing WBSS and vehicles belonging to the incoming WBSS, thereby minimizing the possibility of collision between vehicles.

In other words, for the smart handover of the vehicle, only four short messages of smart handover request/confirm message and Re-Association request/confirm message are transmitted and received between the vehicle and the RSU using wireless channel, and all smart handover processes are performed based on the backbone network among the first RSU, the second RSU, and the WESS-CM. Therefore, it is possible to stably maintain the vehicle network compared to the conventional smart handover method, because only a minimum amount of messages may be transmitted and received.

Figure 6:
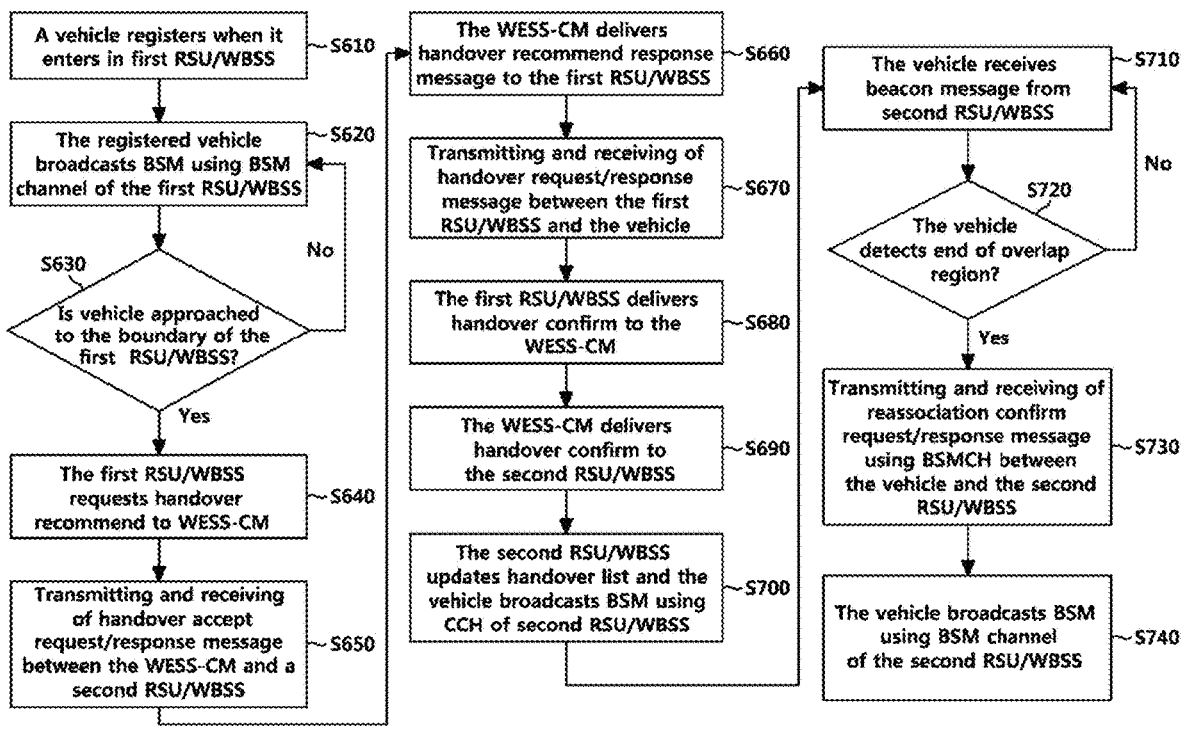
FIG. 6 is a flowchart illustrating a handover procedure according to an example of the present application.

FIG. 6 is a flowchart illustrating a handover procedure according to the example of the present application.

When a new vehicle enters the area of the first RSU of WESS, vehicle registration may be conducted by assigning an identifier to the entered vehicle by the WESS-CM (S610).

The order of registration the vehicle is described in detail in FIG. 6 below.

The vehicle may periodically broadcast the BSM using BSMCH of the first RSU (S620).

Based on the information such as the position, velocity, and direction of the vehicle, the first RSU may determine whether the vehicle approaches the boundary section in which an overlapped portion between the first RSU and the second RSU is located (S630).

If it is determined that the vehicle has approached the boundary section, the first RSU may send handover recommend request message (including vehicle information, vehicle identifier, and association identifier) to the WESS-CM through the backbone network (S640).

The WESS-CM may select the most suitable second RSU based on the information received from the first RSU, and send handover accept request to the second RSU, and receive a handover accept response message from the second RSU, by using a backbone network (S650).

The handover accept response message may include information such as a WAVE basic service set identifier (WBSSID), vehicle position, direction, and velocity.

The WESS-CM may deliver a handover recommend response message to the first RSU through the backbone network (S660).

When the first RSU transmits the handover request message to the vehicle, the vehicle may transmit the handover response message to the first RSU so that the vehicle may perform the handover (S670).

When transmitting and receiving of a handover confirm message for performing a handover procedure between the vehicle and the first RSU is completed, the first RSU may transmit a smart handover confirm message along with vehicle information to the WESS-CM through the backbone network (S680).

In addition, the first RSU may de-allocate the T-slot of the CCH used by the vehicle, and may terminate association with the vehicle.

When the WESS-CM receives the smart handover confirm message from the first RSU, it may transmit the handover confirm message to the second RSU (S690).

During steps S680 and S690, the vehicle may remove the T-slot information of the CCH and the T-slot information of the BSMCH included in the message and change the WAVE basic service set (WBSS) settings to the default settings.

When the vehicle receives the beacon frame periodically transmitted from the second RSU, the vehicle sends the Re-Association confirm request message to the second RSU by using the T-slot of CSMA/CA section of CCH, and the second RSU may allocate T-slot of the BSMCH to the Re-Association confirm request message and then transmit Re-Association confirm message including T-slot information to the vehicle.

The second RSU updates the handover list, and the vehicle broadcasts the BSM by using CCH (S700).

The vehicle may receive a beacon message from the second RSU. (S710).

It is checked whether the vehicle reached the end point of the overlapped region between the first RSU and the second RSU (S720).

When the vehicle reaches the end of the overlapped region between the first RSU and the second RSU, a reassociation confirm request/response message may be transmitted and received between the vehicle and the second RSU by using BSMCH (S730).

When the reassociation with the second RSU is completed, the vehicle may broadcast the BSM by using the allocated T-slot in the BSMCH (S740).

When the transmitting and receiving of the Re-Association confirm message is completed between the vehicle and the second RSU, the second RSU may transmit a handover complete message to the WESS-CM and terminate the handover procedure.

In the above process, the vehicle transmits/receives only basic messages for simple T-slot change with the RSU, and the actual handover procedure is performed through message exchanges among the first RSU, the second RSU, and the WESS-CM using backbone network.

That is, by performing handover while minimizing the wireless communication between the vehicle and the RSUs, the present application may prevent the burden on the wireless network due to unnecessary exchange of many messages and may minimize the BSM loss, thereby maintaining a stable handover and a wireless communication environment.

Figure 7:
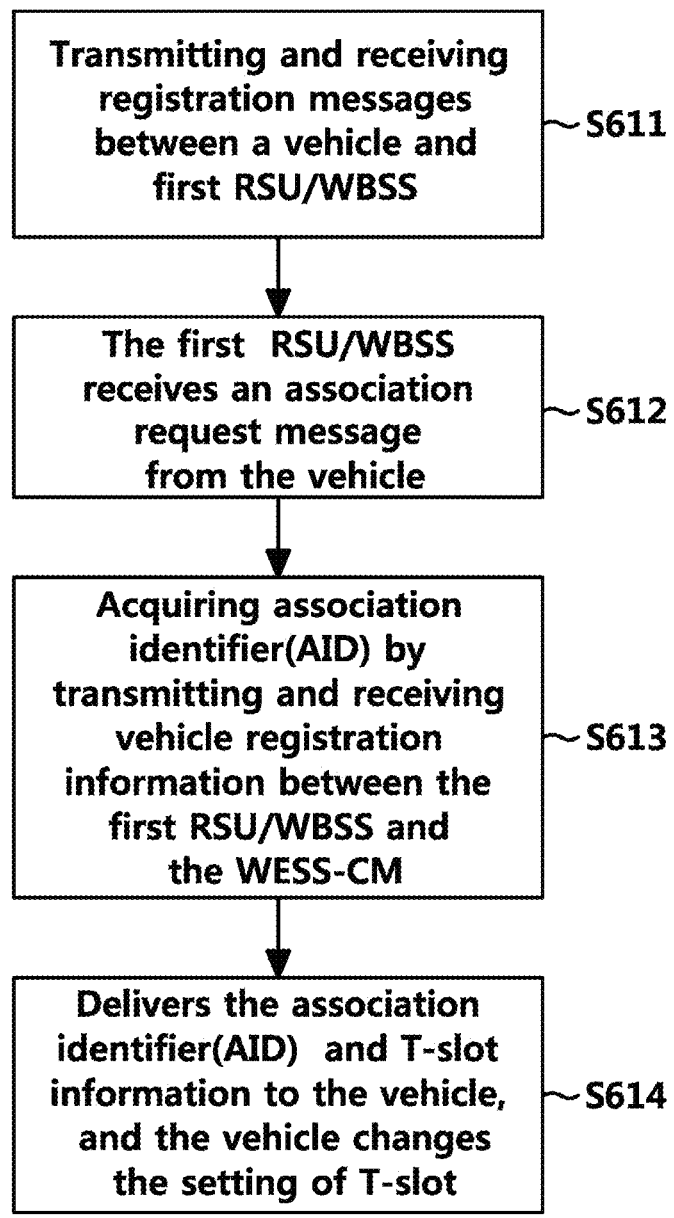
FIG. 7 is a flowchart illustrating a vehicle registration procedure according to an example of the present application.

FIG. 7 is a flowchart illustrating a process of registration of a vehicle in step S610 of FIG. 6 to the WESS-CM.

When a vehicle enters the first RSU area and receives a beacon frame signal periodically transmitted through the T-slot of the CCH channel from the first RSU, the vehicle transmits the vehicle registration request message to the first RSU by using the T-slot of CSMA/CA of the received beacon message, and the first RSU may transmit a request confirm message in response to the vehicle registration request message (S611).

The first RSU may send vehicle registration information to the WESS-CM in response to the vehicle registration request message.

The vehicle may transmit an association request message to the first RSU (S612).

When the WESS-CM confirms that the vehicle is registered, it may generate an association identifier (AID) for association of the vehicle and the vehicle network and transmit it to the first RSU (S613).

Upon receiving the association request message, the first RSU may set the T-slot of the BSMCH for BSM broadcasting by the vehicle.

The first RSU may transmit an association acknowledge message including an association identifier (AID) and T-slot information of the BSMCH to the vehicle.

The vehicle may change the vehicle's configuration parameter settings by using the association identifier (AID) included in the association acknowledge message and the T-slot information of the BSMCH, and periodically broadcast the BSM (S614).

As described in the example of the present application, mutual interference between wireless channels may be minimized by using different T-slots between WBSS by dividing the CCH synchronization interval into a plurality of T-slots, and configuring the plurality of T-slots into a plurality of groups, and then allocating each group to the WBSS.

In addition, the present application allows BSMCH/SCH and CCH to be used together for vehicles moving to another WBSS via a boundary section in an overlapped WBSS environment, so that there is no loss of BSM delivery to both vehicles belonging to the entering WBSS and vehicles belonging to the entering WBSS, thereby minimizing the possibility of collision between vehicles.

In addition, the present application uses smart handover control message exchanges among the first RSU, the second RSU and the WESS-CM, using the backbone network, without repeated registrations at each handover, so that the collision of wireless channel is minimized in the handover procedure while vehicles are moving across the overlapped WBSS boundary area.

In addition, in the present application, a backbone network of a WESS (WAVE Extended Service Set) including a plurality of WBSS is configured with an optical Ethernet-based software defined network (SDN), and by centralizing processing handover between WBSS and the WESS-CM (control and management) system, it is possible to perform optimal handover while recognizing the vehicle network status.

In addition, the present application minimizes the exchange of control messages between the RSU (road-side unit) and the vehicle which are required for handover, so that the exchange of control messages does not burden the wireless network, and by minimizing the exchange of messages between the RSU and the vehicle, the wireless channel burden and BSM loss may be minimized.

The smart handover procedure according to the example of the present application provides a stable handover by operating handover among WBSSs overlapped in the WAVE Extended Service Set (WESS) environment based on a centralized method in the WESS-CM (WESS-Control Manager) system.

In addition, the smart handover procedure according to an example of the present application minimizes the exchange of control messages between the RSU and OBU of the vehicle, thereby minimizing the burden on the wireless network, thereby minimizing BSM loss.

In addition, the smart handover procedure according to the example of the present application minimizes mutual interference between wireless channels used in WBSS and operates based on the TDMA method, thereby preventing collisions from BSM deliveries of each vehicle in advance.

In addition, the smart handover procedure according to the example of the present application allows vehicles moving to another WBSS via a boundary area in an overlapped V2X network environment to use BSMCH/SCH and CCH together, so that there is no BSM delivery loss in all of the vehicles belonging to the outgoing WBSS and the entering WBSS, thereby minimizing the possibility of collision between vehicles.

Features, structures, effects, and the like described in the above-described examples are included in at least one example of the present application, and are not necessarily limited to only one example. Furthermore, the features, structures, effects, etc. illustrated in each example may be combined or modified for other examples by a person having ordinary knowledge in the field to which the examples belong.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A handover method in a vehicle network, for managing Wireless Access in Vehicle Environments (WAVE) Basic Service Set (WBSS) vehicle network which is managed by a WAVE Extended Service Set Control and Management System (WESS-CM) and provided by using Road Side Unit (RSU) in multiple vehicle environments having overlapped areas, comprising:

recognizing that a vehicle enters an overlapped area between a first WBSS and a second WBSS;
sending, by the first WBSS, a handover recommend request to the WESS-CM;
confirming with the second WBSS, by the WESS-CM, whether handover is possible;
responding to the WESS-CM, by the second WBSS, the availability of the handover after allocating communication resources available for the vehicle;
sending, by the WESS-CM, a handover recommend response to the first WBSS;
transmitting, by the first WBSS, a handover request message to the vehicle;
performing the handover, by the vehicle receiving the handover request message, by performing reassociation with the second WBSS; and
periodically broadcasting, by the vehicle, a basic safety message (BSM) using a T-slot in a shared control channel (CCH) and a T-slot in a BSM channel (BSMCH) for the second WBSS, while the vehicle is located in the overlapped area,
wherein the handover request message is transmitted by using a T-slot which is one of a plurality of slots divided from one synchronization interval of the CCH in a vehicle network system configured with a TDMA-based MAC protocol, and
wherein the vehicle and the WBSSs operate the CCH and the BSMCH simultaneously by using a dual radio interface.

2. The method of claim 1,
wherein the CCH is shared by a plurality of WBSSs,
wherein a plurality of T-slots located in the one synchronization interval is separately allocated to the WBSSs, non-overlappingly and respectively, and
wherein a number of the T-slots in the BSMCH defines the maximum number of vehicles per each of the WBSSs within the one synchronization interval.

3. The method of claim 2,
wherein a first T-slot of T-slots group in the CCH is used for broadcasting a beacon frame including TDMA information of the WBSSs, and
wherein the beacon frame includes any one or more of time division multiple access information of the WBSSs required, allocation information of the T-slot in a BSMCH interval, and RSU position information and WBSS cell radius information of the RSU which are required for a registration requested for the vehicle requiring vehicle registration by entering the WBSSs.

4. The method of claim 3,
wherein the remaining T-slots of the T-slots group in the CCH excluding the first T-slot used for the beacon frame broadcasting, are used by dividing into a Carrier Sense Multiple Access with Collision Avoidance (CSMA/CA) mode section and a Time Division Multiple Access (TDMA) mode section.

5. The method of claim 4,
wherein the T-slots in CSMA/CA mode section are used for the registration procedure of the newly entering vehicle to the WBSSs when the vehicle enters the WESS-CM, and data transmission requests of registered vehicles.

6. The method of claim 1,
wherein the first WBSS requesting the handover recommend transmits a handover recommend request message including association identifier (AID), vehicle driving information, and a WAVE basic service set identifier (WBSSID) to the WESS-CM.

7. The method of claim 1,
wherein the confirming the availability of the handover comprises:
  determining, by the WESS-CM, the second WBSS for performing handover based on driving information of the vehicle;
  requesting a handover accept, by the WESS-CM, to the second WBSS; and
  responding to the WESS-CM, by the second WBSS, after checking and allocating resources available for the vehicle.

8. The method of claim 1,
wherein the handover request message includes a WAVE basic service set identifier (WBSSID), the BSMCH, and association identifier (AID) information, and
wherein the vehicle changes vehicle settings based on the WBSSID, the BSMCH, and the AID information included in the handover request message.

9. The method of claim 1,
wherein the performing the handover, comprises:
  (i) sending, by the first WBSS, a handover recommend request message to the WESS-CM;
  (ii) performing, by the WESS-CM, a handover decision making that selects a second WBSS for the vehicle;
  (iii) sending, by the WESS-CM, a handover accept request message to the selected second WBSS;
  (iv) checking, by the second WBSS, an availability of communication resource for the handover accept request message;
  (v) sending, by the second WBSS, a handover accept response message to the WESS-CM;
  (vi) sending, by the WESS-CM, a handover recommend response message to the first WBSS;
  (vii) sending, by the first WBSS, a handover request message to the vehicle that entered the overlapped area;
  (viii) sending, by the vehicle, a handover response message to the first WBSS;
  (ix) sending, by the first WBSS, a handover confirm message to the second WBSS via the WESS-CM that relays the handover confirm message;
  (x) updating, by the second WBSS, a handover list with addition of the newly handovered vehicle/onboard unit (OBU) to a vehicle/OBU list;
  (xi) detecting, by the vehicle, the end of overlapped region by comparing the signal strengths from the first WBSS and the second WBSS;
  (xii) receiving, by the vehicle, a beacon frame transmitted from the second WBSS;
  (xiii) obtaining, by the vehicle, allocated T-slot information included in the beacon frame;
  (xiv) sending, by the vehicle, a Re-Association confirm request message to the second WBSS using the T-slot that is allocated for the vehicle by the second WBSS;
  (xv) sending, by the second WBSS, a handover complete request message to the WESS-CM;
  (xvi) updating, by the WESS-CM, downlink backbone network;
  (xvii) sending, by the WESS-CM, a handover complete response message to the second WBSS;
  (xviii) sending, by the second WBSS, a Re-Association confirm response message with the allocated T-slot information in the BSMCH for broadcasting BSM messages;
  (xix) broadcasting, by the vehicle, the BSM using both the T-slot in the shared CCH and the T-slot in the BSMCH allocated for the second WBSS while the vehicle is located in the overlapped area in order to guarantee a BSM delivery to neighbor vehicles in the overlapped area; and (xx) periodically broadcasting, by the vehicle, BSMs using only the T-slot in the BSMCH while the vehicle is located not in the overlapped area.

* * * * *